(12) United States Patent
Liu et al.

(10) Patent No.: US 11,513,918 B2
(45) Date of Patent: Nov. 29, 2022

(54) ACTION UNDO SERVICE BASED ON CLOUD PLATFORM

(71) Applicant: Microsoft Technology Licensing, LLC, Redmond, WA (US)

(72) Inventors: Shanshan Liu, Redmond, WA (US); Miao Zou, Redmond, WA (US); Jian Zhou, Redmond, WA (US); Tianjing Xu, Redmond, WA (US); Yucao Wang, Redmond, WA (US); Lei Zhang, Bellevue, WA (US); Ao Guo, Redmond, WA (US); Hao Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 16/617,447

(22) PCT Filed: May 23, 2018

(86) PCT No.: PCT/US2018/034025
§ 371 (c)(1),
(2) Date: Nov. 26, 2019

(87) PCT Pub. No.: WO2018/231450
PCT Pub. Date: Dec. 20, 2018

(65) Prior Publication Data
US 2020/0167242 A1    May 28, 2020

(30) Foreign Application Priority Data
Jun. 12, 2017 (CN) .......................... 201710439975.8

(51) Int. Cl.
*G06F 11/00* (2006.01)
*G06F 11/14* (2006.01)
*G06F 9/46* (2006.01)

(52) U.S. Cl.
CPC .......... *G06F 11/1469* (2013.01); *G06F 9/467* (2013.01)

(58) Field of Classification Search
CPC ............. G06F 11/1402; G06F 11/1446; G06F 11/1458; G06F 11/1464; G06F 11/1469;
(Continued)

(56) References Cited

U.S. PATENT DOCUMENTS

| 6,111,575 A | 8/2000 | Martinez et al. |
| 8,001,091 B2 | 8/2011 | Allen et al. |

(Continued)

FOREIGN PATENT DOCUMENTS

| CN | 101853199 A | 10/2010 |
| CN | 102142024 A | 8/2011 |
| CN | 105431821 A | 3/2016 |

OTHER PUBLICATIONS

"International Search Report and Written Opinion Issued in PCT Application No. PCT/US2018/034025", dated Aug. 29, 2018, 16 Pages.

(Continued)

*Primary Examiner* — Marc Duncan
(74) *Attorney, Agent, or Firm* — Schwegman Lundberg & Woessner, P.A.

(57) ABSTRACT

The present disclosure provides technical solutions related to action undo service based on cloud platform. Related operations dependent on target operations to be undone may be obtained by dependency analysis and the target operations and the related operations may be undone by time sequence so as to reduce the conflict caused by the undo operations.

20 Claims, 10 Drawing Sheets

(58) Field of Classification Search
CPC ............. G06F 11/1474; G06F 11/0793; G06F 11/1471
See application file for complete search history.

(56) References Cited

U.S. PATENT DOCUMENTS

| | | | |
|---|---|---|---|
| 9,367,337 B1 | 6/2016 | Eilam | |
| 2004/0006764 A1 | 1/2004 | Van De Vanter et al. | |
| 2009/0006493 A1* | 1/2009 | Draper | G06F 8/71 |
| 2009/0063580 A1 | 3/2009 | Allen et al. | |
| 2011/0106776 A1* | 5/2011 | Vik | G06F 9/451 |
| | | | 707/698 |
| 2013/0080480 A1 | 3/2013 | Mao et al. | |
| 2013/0117238 A1* | 5/2013 | Gower | G06F 11/1474 |
| | | | 707/684 |
| 2013/0227454 A1 | 8/2013 | Thorsander et al. | |
| 2016/0077900 A1 | 3/2016 | Wada et al. | |
| 2016/0342656 A1 | 11/2016 | Dubost et al. | |
| 2018/0018241 A1* | 1/2018 | Sanocki | G06F 11/14 |

OTHER PUBLICATIONS

Satyal, et al., "Scalable Rollback for Cloud Operations Using AI Planning", In Proceedings of 24th Australasian Software Engineering Conference, Sep. 28, 2015, pp. 195-202.
Weber, et al., "Automatic Undo for Cloud Management via AI Planning", In Proceedings of Eighth USENIX Conference on Hot Topics in System, Oct. 7, 2012, 6 Pages.
Weber, et al., "Supporting Undoability in Systems Operations", In Proceedings of 27th Large Installation System Administration Conference, Nov. 3, 2013, pp. 75-87.
"First Office Action and Search Report Issued in Chinese Patent Application No. 201710439975.8", dated Jul. 5, 2021, 18 Pages.
Solanki, et al., "Estimating and Undoing Rotation for Print-Scan Resilient Data Hiding", In Proceedings of the International Conference on Image Processing, Oct. 24, 2004, 5 Pages.
Gaochang, Zhao, "Arithmetics and realization of more steps infinite undo and redo", In Journal of Xi'an University of Science and Technology, vol. 29, Issue 14, Jul. 2009, pp. 500-504.
"Office Action Issued in European Patent Application No. 18734659.8", dated Jul. 5, 2021, 9 Pages.
"Office Action and Search Report Issued in Chinese Patent Application No. 201710439975.8", dated May 6, 2022, 10 Pages.
Xiuyuan, et al., "Database Principles and Applications", In Publication of Southwest Jiaotong University Press, Oct. 31, 2016, 12 Pages.
"Second Office Action Issued in Chinese Patent Application No. 201710439975.8", dated Jan. 24, 2022, 13 Pages.
"Summon to Attend Oral Proceedings Issued in European Patent Application No. 18734659.8", Mailed Date: Sep. 27, 2022, 2 Pages.
"Summon to Attend Oral Proceedings Issued in European Patent Application No. 18734659.8", Mailed Date: Sep. 20, 2022, 13 Pages.

* cited by examiner

ACTION UNDO SERVICE BASED ON CLOUD PLATFORM

CROSS-REFERENCE TO RELATED APPLICATION

This application is a U.S. National Stage Filing under 35 U.S.C. 371 of International Patent Application Serial No. PCT/CN2018/034025, filed May 23, 2018, and published as WO 2018/231450 A1 on Dec. 20, 2018, which claims priority to Chinese Application No. 201710439975.8, filed Jun. 12, 2017, which applications and publication are incorporated herein by reference in their entirety.

BACKGROUND

Cloud platforms allow user do many complex operations with single command. However, when users make one or a series of wrong actions, it will be a disaster for their services, and manually recovery is very difficult. Nowadays, there is no tool in mainstream cloud platforms that could cancel management action series and recover the services status.

BRIEF SUMMARY

The embodiments of the present disclosure is provided to give a brief introduction to some concepts, which would be further explained in the following description. This Summary is not intended to identify essential technical features or important features of the subject as claimed nor to limit the scope of the subject as claimed.

A technical solution related to action undo service based on cloud platform is disclosed. Related operations dependent on target operations to be undone may be obtained by dependency analysis and the target operations and the related operations may be undone by time sequence so as to reduce the conflict caused by the undo operations.

The above description is merely a brief introduction of the technical solutions of the present disclosure, so that the technical means of the present disclosure may be clearly understood, and implemented according to the description of the specification, and the above and other technical objects, features and advantages of the present disclosure may be more obvious based on the embodiments of the present disclosure as follows.

DETAILED DESCRIPTION

Figure 1:
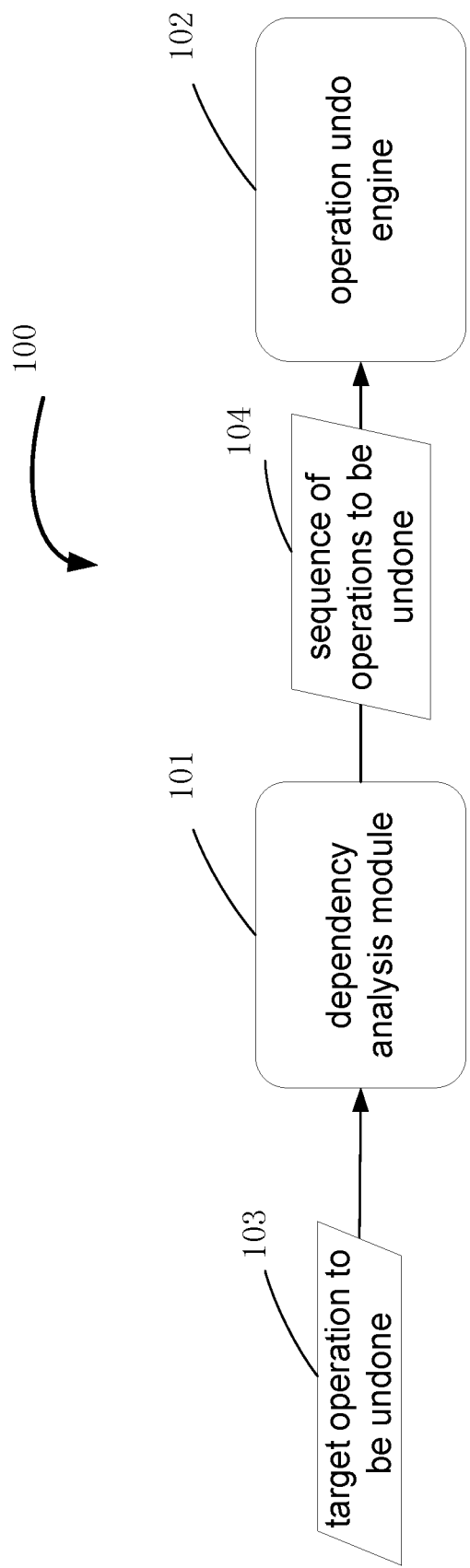
FIG. 1 is a block diagram of action undo service based on cloud platform of embodiments of the present disclosure.

In the following, description will be given in detail on the exemplary embodiments of the present disclosure, in connection with the accompanying drawing. Although drawings show the exemplary embodiments of the present disclosure, it should be appreciated that the present disclosure may be implemented in various ways without being limited by the embodiments set forth herein. On the contrary, these embodiments are provided for thorough understanding of the present disclosure, and completely conveying the scope of the present disclosure to the skills in the art.

Explanation for Terms

Dependency: If the execution of one operation affects directly or indirectly one instance property to which another operation is related, these two operations may be regarded as having dependency therebetween. The "related" mentioned here refers to another operation need this instance property as conditions or the execution of another operation may change or affect the instance property.

Affected relationship between instance properties: if changes of one instance property may affect directly or indirectly another instance property, it may be regarded that these two instance properties have affected relationship therebetween. The affected relationship between the instance properties as mentioned here may be the case that one instance property affects another instance property, or one instance property is affected by another instance property, or these two instance properties affect each other.

Affected relationship between service instances: if changes of one service instance may affect directly or indirectly another service instance, it may be regarded that these two service instances have affected relationship therebetween. The affected relationship between the service instances as mentioned here may be the case that one service instance affects another service instance, or one service instance is affected by another service instance, or these two instances affect each other.

In the present disclosure, term "technique" may refer to, for example, system(s), method(s), computer-readable instructions, module(s), algorithm, hardware logic (e.g., Field-Programmable Gate Array (FPGA)), Application Specific Integrated Circuit (ASIC), Application Specific Standard Parts (ASSP), System on Chip (SOC), Complex Programmable Logic Device (CPLD), and/or other technique allowable in the above context and the present disclosure.

Cloud computation is a kind of convenient service. A user may be allowed to use single instruction to do many complex operations on a cloud platform. However, it may magnify the influence of wrong operations. When a user performs one or a series of wrong operations, serious influence may be brought to the cloud service. In such situation, manual system recovery not only needs knowledge and technique related to cloud computation, but also involves complex operations, since such recovery may involve running of many other services. In view of such state, the present disclosure provides a technical solution of operations undo solution, which may find related operations having dependency relationship with a target operation to be undone by dependency analysis upon determining the target operation, and undo these related operations in time sequence so that the operation undo service on cloud platform may be realized in a condition that the system stability may be guaranteed.

FIG. 1 is a block diagram 100 of action undo service based on cloud platform of embodiments of the present disclosure. The procedure of undoing operations based on cloud platform may mainly involve two modules of dependency analysis module 101 and operation undo engine 102. When a user or OS (operation system) selects a target operation 103 to be undone, the target operation may be firstly input the dependency analysis module 101 for dependency analysis so as to find all related operations having dependency with the target operation. The undo operations to be performed would not affect other operations before the target operation is performed, therefore the related operations mentioned here refer to operations after the target operation. Furthermore, in the embodiments of the present disclosure, dependency refers instance property to which related operations affected directly or indirectly by a target operation. Based on processing of the dependency analysis module 101, related operations having dependency with the target operation may be found, and a sequence of operations to be undone 104 may be formed in time order. Then, the sequence of operations to be undone 104 may be input to the operation undo engine 102, and the operation undo engine 102 may perform undo processing on each operations sequentially according to the sequence of operations to be undone.

With the operations undo service in the present disclosure, when there is wrong operation or in other cases that it is necessary to undo operations, the operation and related operations having dependency with the operation may be undone together so as to prevent the undo processing on the operation from affecting other service in the system without the recovery processing on the whole system. The flexibility and fault-tolerance of user in performing cloud operations may be improved.

Figure 2:
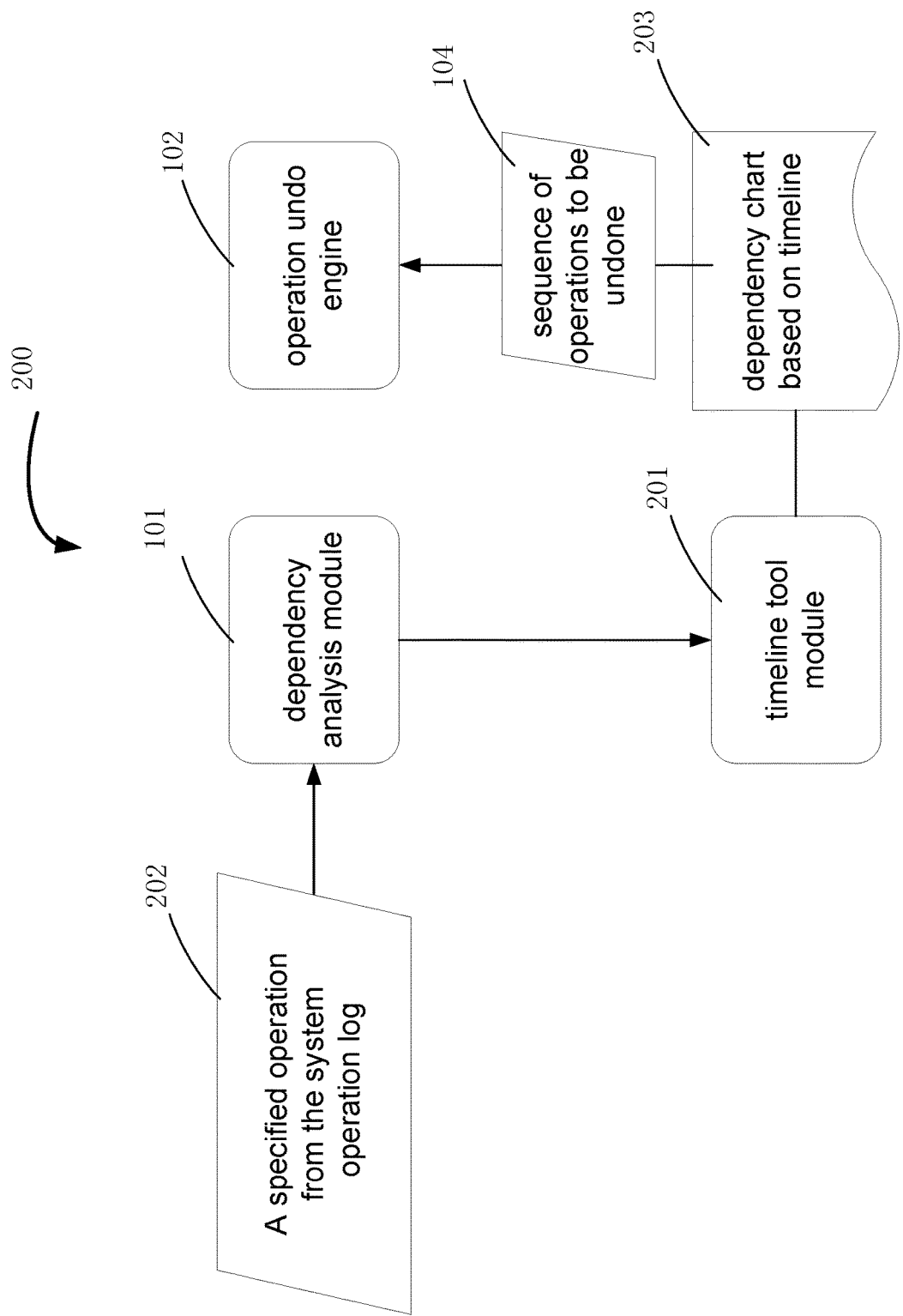
FIG. 2 is another block diagram of action undo service based on cloud platform of embodiments of the present disclosure.

FIG. 2 is another block diagram 200 of action undo service based on cloud platform of embodiments of the present disclosure. The diagram 200 shows another scenario where the action undo service based on cloud platform is applied. Operations based on cloud platform may be recorded in a system operation log. A user may select one operation from the system operation log as a specified operation 202, and then sort the specified operation and the found related operations by time sequence and generate a dependency chart 203 based on timeline with a timeline tool module 201, which may be shown to the user. The user may intuitively select a recovery time point that he wants by the dependency chart 203 based on timeline. Then, the timeline tool module 201 may sort all related operations or all related operations together with the specified operation after the selected recovery time point in an order of operating time so as to generate a sequence 104 of operations to be undone, and send the sequence to the operation rollback engine 102 for the operation undo processing. The dependency analysis module 101 and the operation rollback module 102 in the diagram 200 may have the same functions in the diagram 100.

The system as shown in the diagram 200 may show the user the dependency chart 203 based on timeline in an intuitive way, so as to facilitate the user to undo operations.

In the following, detailed explanation would be made on each part of system diagram 100 and system diagram 200.

Dependency Analysis Module

Operations based on cloud platform may depend on instance properties of a service instance when being executed. If one operation changes the instance properties of a service instance, such change may affect other sequential operations related to the service instance, even affect other service instances and further affect the operations based on those other service instances. Therefore, in embodiments of the present disclosure, before undoing a target operation, dependency analysis may be performed to find sequential operations affected by the target operation, and the conflict brought by the undo processing of the target operation may be eliminated by undoing the sequential operations.

Figure 3:
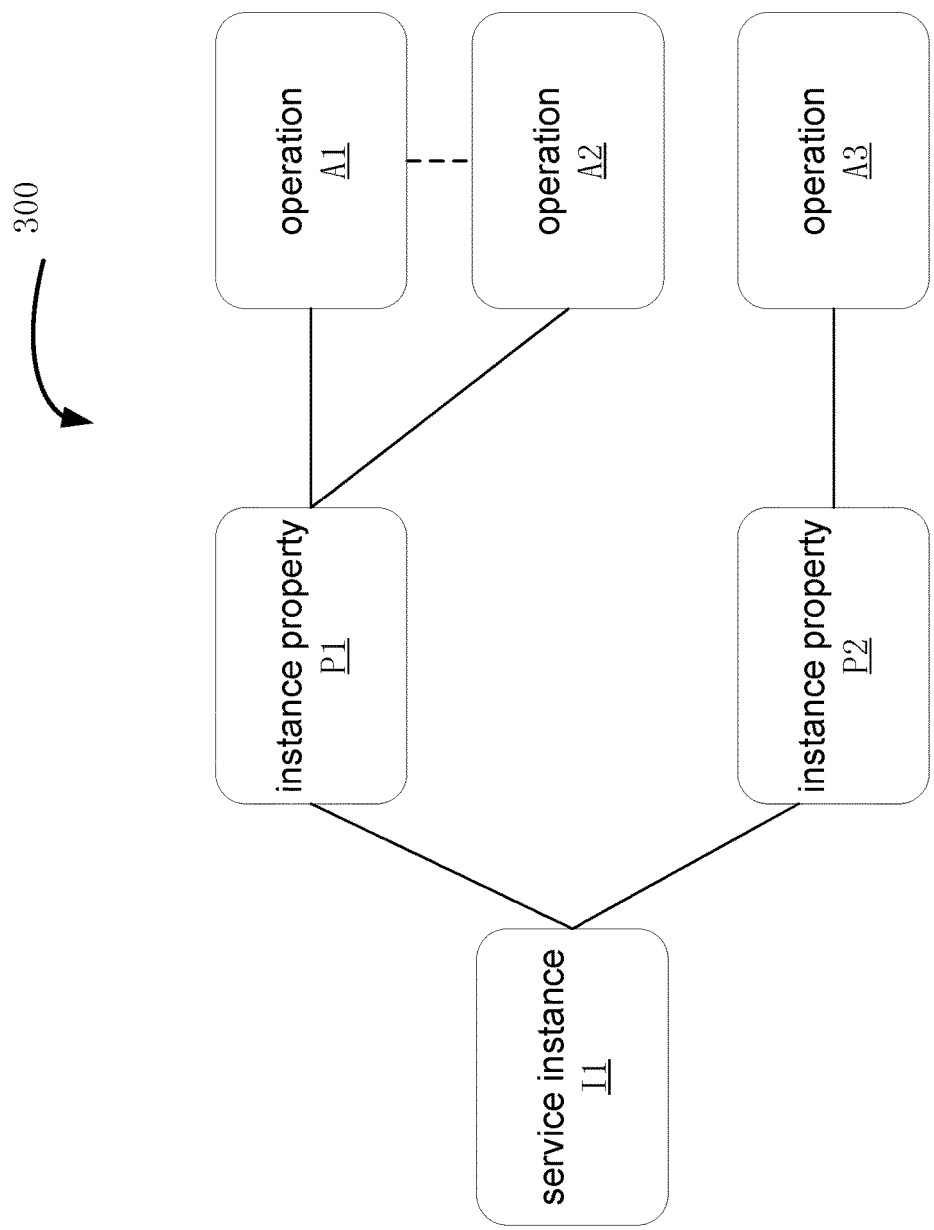
FIG. 3 is a block diagram showing exemplary scenario of dependency analysis of embodiments of the present disclosure.

FIG. 3 is a block diagram 300 showing exemplary scenario of dependency analysis of embodiments of the present disclosure. In the diagram 300 showing a service instance I1 which has an instance property P1 and an instance property P2. An operation A1 changes the instance property P1, while an operation A2 occurs after the operation A1 and is related to the instance property P1. Therefore, the operations A1 and A2 have dependency therebetween, which is shown in the diagram with dash lines.

For example, the service instance may be a database managing instance. More particularly, the instance property P1 is database version information managed by the database managing instance, and the instance property P2 is access authority information of the database. The operation A1 is an operation of upgrading the database, e.g., from version 1.0 to version 2.0. Therefore, the operation A1 changes the instance property P1 (e.g., from version 1.0 to version 2.0). The operation A2 is also an operation of upgrading the database, e.g., from version 2.0 to version 3.0. An operation A3 is an operation of changing the access authority of the database.

It may be assumed that in an operation of upgrading or reverting versions of the database, it is necessary to perform the upgrading or reverting in an order of versions. For example, if it is planned to upgrade from version 1.0 to version 3.0, it is necessary to first upgrade from version 1.0 to version 2.0, and then from version 2.0 to version 3.0. On the contrary, if it is planned to revert from version 3.0 to version 1.0, it is necessary to first revert from version 3.0 to version 2.0, and then from version 2.0 to version 1.0. It is obvious that if the operation A1 is to be undone, it is necessary to undo operation A2. Therefore, the operations A1 and A2 have dependency therebetween. The operations A3 and A1 are not related to the same instance property, and the upgrading operation of database would not change the access authority of database. Therefore, the operations A3 and A1 do not affect each other and thus they do not have dependency therebetween.

Figure 4:
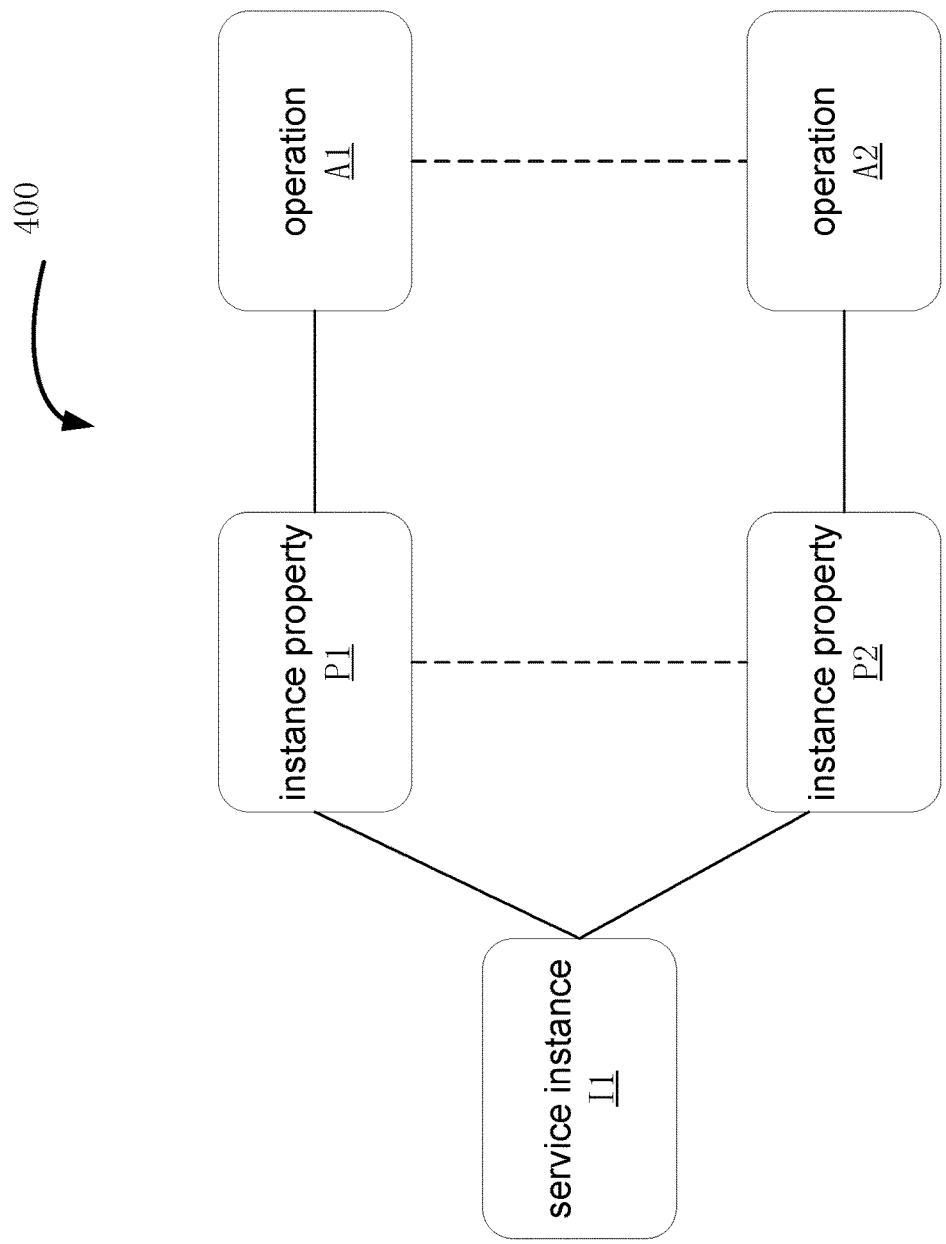
FIG. 4 is another block diagram showing exemplary scenario of dependency analysis of embodiments of the present disclosure.

FIG. 4 is another block diagram 400 showing exemplary scenario of dependency analysis of embodiments of the present disclosure. In the diagram 400, a service instance I1 is shown. More particularly, the service instance I1 has instance properties P1 and P2. The operation A1 is an operation to change the instance property P1, and the operation A2 is an operation executed after the operation A1 and is related to the instance property P2. The instance properties P1 and P2 have affecting relationship therebetween (shown in the diagram with dash lines), and thus the operations A1 and A2 have dependency therebetween (shown in the diagram with dash lines).

For example, the service instance I1 is an instance of managing virtual machine cluster. More particularly, the instance property P1 is IP address of the virtual machine cluster and the instance property P2 is the power-on/off state of the virtual machine cluster. The operation A1 is an operation of changing the IP address of virtual machine cluster, and the operation A2 is an operation of shutting down the virtual machine cluster. It may be assumed that the IP address of the virtual machine cluster may be changed only when the virtual machine cluster is in the power-on state. Based on such assumption, the power-on/off state of the virtual machine cluster may affect the operation of changing the IP address of the virtual machine cluster. That is, the instance property P1 is affected by the instance property P2. Based on such affecting relationship, The executing and reverting of operation A1 may both need an pre-condition that the instance property P2 is the power-on state of the virtual machine cluster. The execution of operation A2 may result in that the instance property P2 is the power-off state of the virtual machine cluster, which may directly result in that it is impossible to revert the operation A1. Therefore, the operations A1 and A2 have dependency therebetween, and if the operation A1 is to be undone, it is necessary to revert the operation A2.

Figure 5:
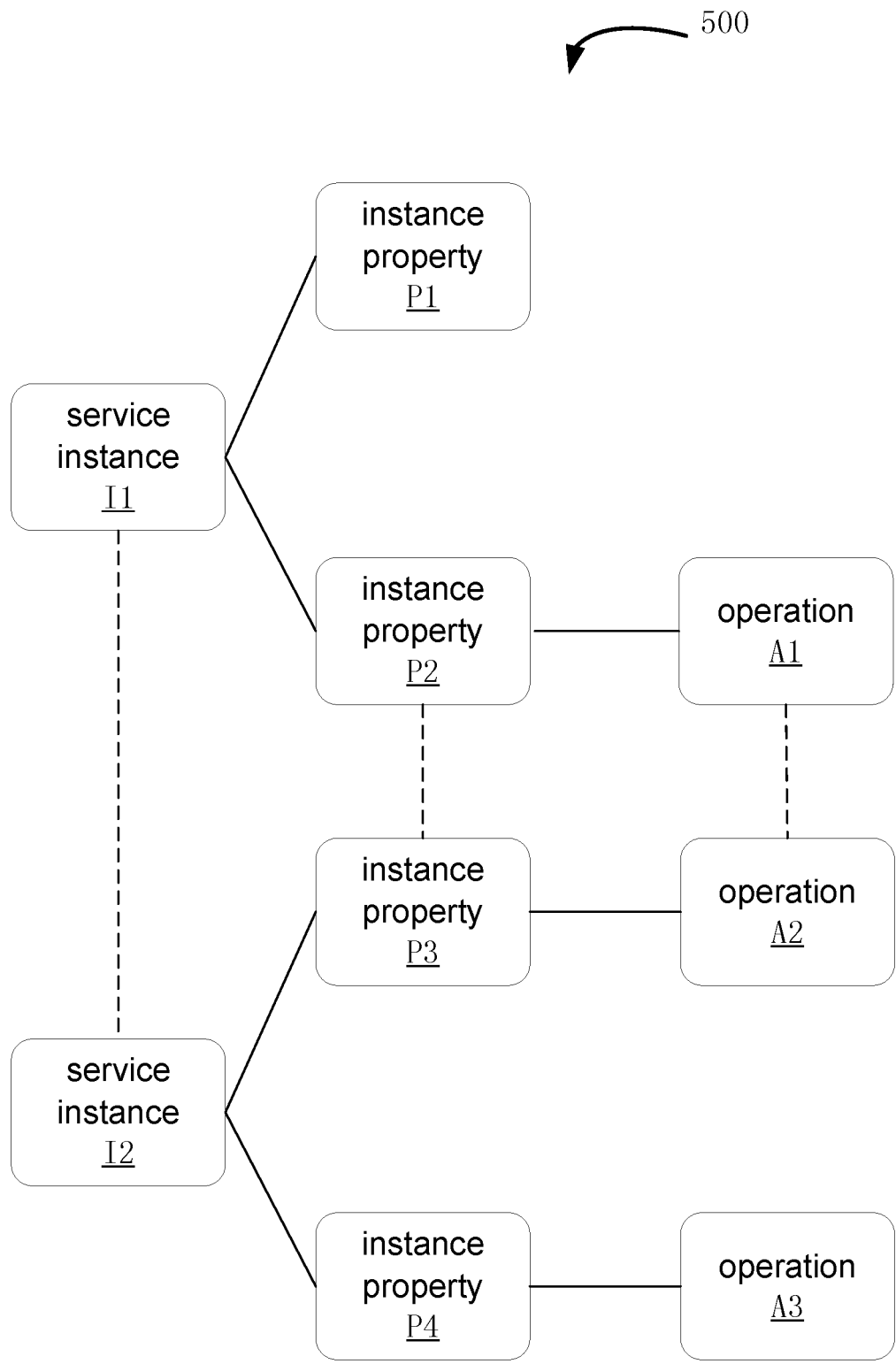
FIG. 5 is still another block diagram showing exemplary scenario of dependency analysis of embodiments of the present disclosure.

FIG. 5 is still another block diagram 500 showing exemplary scenario of dependency analysis of embodiments of the present disclosure. In the diagram 500, service instances I1 and I2 are shown. More particularly, the service instance I1 has instance properties P1 and P2, and the service instance I2 has instance properties P3 and P4. An operation A1 changes the instance property P2, and an operation A2 is executed after the operation A1 and related to the instance property P3. The service instances I1 and I2 have affecting relationship therebetween (shown in the diagram with dash lines), and the instance property P2 in the service instance I1 and the instance property P3 of the service instance I2 have affecting relationship therebetween (shown in the diagram with dash lines). Therefore, the operations A1 and A2 have dependency therebetween (shown in the diagram with dash lines).

For example, the service instance I1 is an instance of managing a virtual machine cluster. More particularly, the instance property P1 of the service instance I1 is the deploy location of the virtual machine cluster in the data center, and the instance property P2 of the service instance I1 is the access authority to the virtual machine cluster. The service instance I2 is a virtual machine instance of the virtual machine cluster described above, i.e., the service instance I2 is under management of the service instance I1. Therefore, the service instances I1 and I2 have affecting relationship therebetween. The instance property P3 of the service instance I2 is an access authority to the virtual machine, and the instance property P4 of the service instance I2 is the deploy location of the virtual machine in the data center. It should be noted that, the access authority of a user to one virtual machine is on the premise of the access authority to the virtual machine cluster. The access authority of a user to one virtual machine is allowed only when the access authority of the user to the virtual machine cluster is allowed. Therefore, the instance properties P3 and P2 have affecting relationship therebetween.

The operation A1 is allowing the access authority of a user to the virtual machine cluster. The operation A2 is executed after the operation A1 and is allowing the access authority of the user to a virtual machine corresponding to the instance I2. Furthermore, the instance properties P3 and P2 have affecting relationship therebetween, and thus the operation A2 is on the premise of the operation A1. If the undo processing on the operation A1 affects the operation A2, the operations A1 and A2 have dependence therebetween. Furthermore, the operation A3 is executed after the operation A2 and is an operation of moving the deploy location of the virtual machine corresponding to the service instance I2 in the data center. Therefore, the operation A3 is not related to the operations A2 and A1 and these operations would not affect each other. Therefore, the operation A3 and the operations A2 and A1 do not have dependency.

For example, with reference to the diagram 500, the service instance I1 is an instance for managing virtual machine cluster. More particularly, the instance property P1 of the service instance I1 is the access authority of a user to the virtual machine cluster, and the instance property P2 of the service instance I1 is a backup scheme of the virtual machine cluster (local backup or remote backup). The service instance I2 is a virtual machine instance of the virtual machine cluster described above, i.e., the service instance I2 is under the management of the service instance I1. Therefore, the service instances I1 and I2 have affecting relationship therebetween. The instance property P3 of the service instance I2 is a backup scheme of the virtual machine (local backup or remote backup), and the instance property P4 of the service instance I2 is the access authority of a user to the virtual machine. The backup scheme of the virtual machine cluster directly affects the backup schemes of virtual machines in the virtual machine cluster. Therefore, the instance property P2 of the service instance I1 and the instance property P3 of the service instance I2 have affecting relationship therebetween.

An operation A1 is an operation of changing the backup scheme of the virtual machine cluster from local backup to remote backup, which directly changes the instance property P2 of the service instance I1. The service instances I1 and I2 have affecting relationship therebetween and the instance property P2 of the service instance I1 and the instance property P3 of the service instance I2 have affecting relationship therebetween. Therefore, the operation A1 indirectly affects the backup scheme of the virtual machine corresponding to the service instance I2, i.e., the operation A1 indirectly affects the instance property P3 of the service instance I2. The operation A2 is after the operation A1 and is an operation of stop the backup of the virtual machine corresponding to the service instance I2. The undo processing on operation A1 is to change the backup scheme of the virtual machine cluster back to the scheme of local backup. The backup of the virtual machine corresponding to the service instance I2 is in a state of working before the operation A1 is executed. However, the backup of the virtual machine corresponding to the service instance I2 is stopped after the operation A2 is executed and cannot be restored to the state before the operation A1 is executed. Therefore, the operations A1 and A2 have dependency therebetween. It is necessary to undo the operation A2, i.e., start the backup of the virtual machine corresponding to the service instance I2, before the operation A1 is undone. The operation A3 is an operation of allowing the access authority of a user to the virtual machine corresponding to the service instance I2. The operation A3 is not related to the operations A2 and A1 and these operations would not affect each other. Therefore, the operation A3 and the operations A2 and A1 do not have dependency.

In the above, explanation has been made on the dependency analysis made by the dependency analysis module 101. The dependency analysis module 101 may perform dependency analysis on a target operation 103 to be undone, and output a sequence 104 of operations to be undone, which have dependency with the target operation. The sequence 104 of operations to be undone may soft the operations in operating time sequence, so as to facilitate the undo processing performed by the sequential operation rollback engine 102.

Operation Rollback Engine

Figure 6:
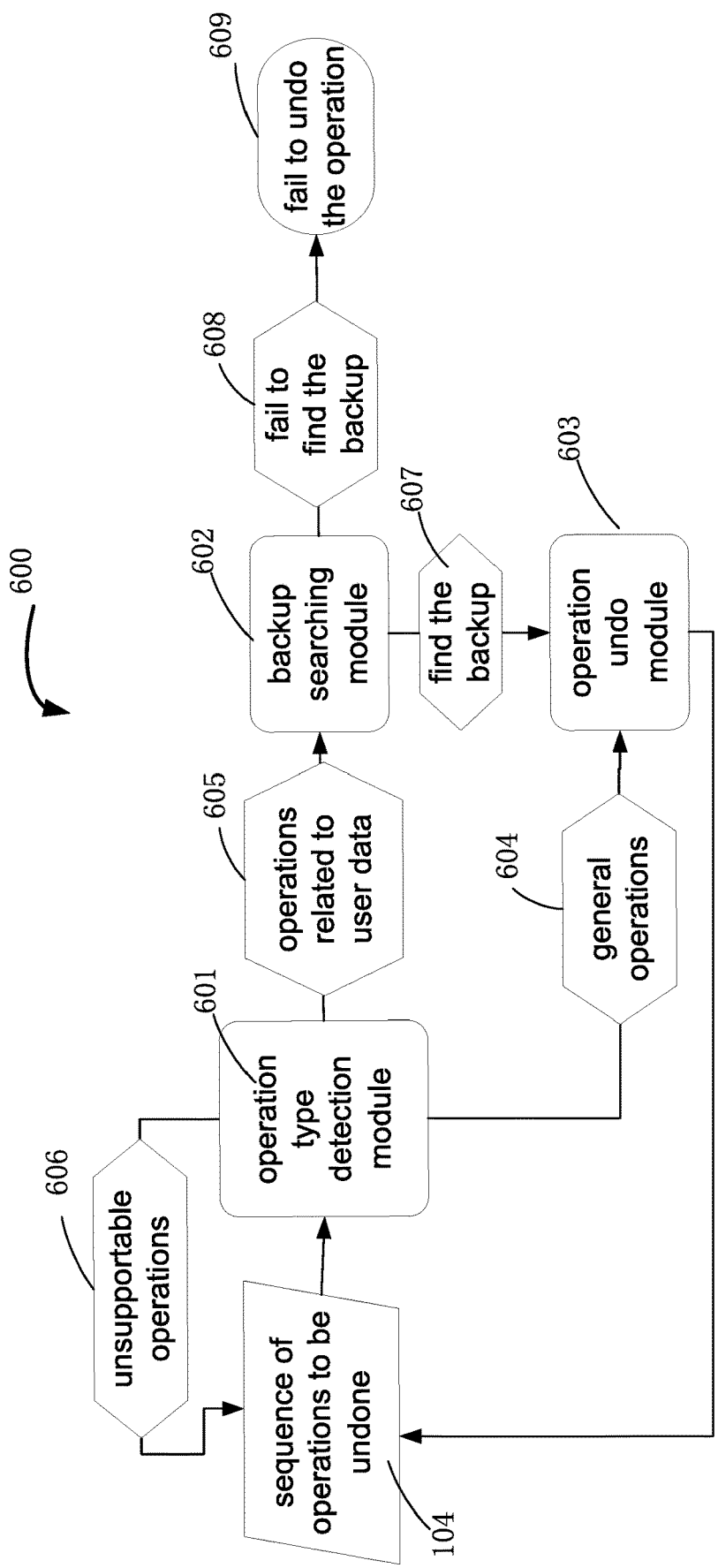
FIG. 6 is a structural diagram showing operation rollback engine of embodiments of the present disclosure.

FIG. 6 is a structural diagram 600 showing operation rollback engine 102 of embodiments of the present disclosure. The main function of the operation rollback engine 102 is to perform an undo processing according to the sequence 104 of operations to be undone generated by the dependency analysis module 101. In the diagram 600, an operation type detection module 601, a backup searching module 602, and an operation undo module 603.

The operation type detection module 601 may take out operations to be undone sequentially from the sequence 104 of operations to be undone and determine the type of the operations to be undone so that corresponding sequential operations may be executed according to different type of the operations to be undone. The operation rollback engine 102 may perform the type detection on each operation to be undone in the sequence 104 of operations to be undone and perform corresponding processing according to the operation type of the operations to be undone, since there are many types of operations to be undone and not any operation is available to be undone. More particularly, the operations to be undone may be classified into three types:

(1) General Operations 604: Operations Only Change Property of a Service Instance without Changing User Data.

For example, such general operations may include: changing IP address of a virtual machine, changing safety strategy of a service instance, changing access authority of a user, and so on. If the operation to be undone is a general operation, the operation type detection module 601 may send the operation to be undone to the undo operation module 603 for the undo processing.

(2) Operations 605 Related to User Data

For example, such operations 605 may include: operations related to data backup, operations related to updating data of database, operations of installing software in the virtual machine, and so on.

If the operation to be undone is an operation related to user data, the operation type detection module 601 may send the operation to be undone to the backup searching module 602, and the backup searching module 602 may perform search to find whether or not there is a user data backup before the operation is executed. If the searching result is "find the backup" 607, the operation to be undone may be send to the operation undo module 603 so that the undo processing may be performed. If the searching result is "fail to find the backup" 608, the undo processing of the operation rollback engine 102 may be terminated, i.e., the undo processing on the subsequent operations to be undone in the sequence 104 of operations to be undone may be terminated, and the result of "fail to undo the operation".

(3) Unsupportable Operations 606: Operations which are Undoable or for which the Undo Processing is Meaningless, and Unsupportable by the Operation Rollback Engine 102.

For example, the operations 606 may include: restarting the virtual machine, for which the undo processing is meaningless, and looking for logs, which is a kind of one-time operation and cannot be undone.

If an operation to be done is the operation which is undoable or for which the undo processing is meaningless, i.e., unsupportable by the operation rollback engine 102, the operation type detection module 601 may omit that operation and keep accessing the sequence 104 of operations to be undone to take out the next operation to be undone.

Timeline Tool Module

Figure 7:
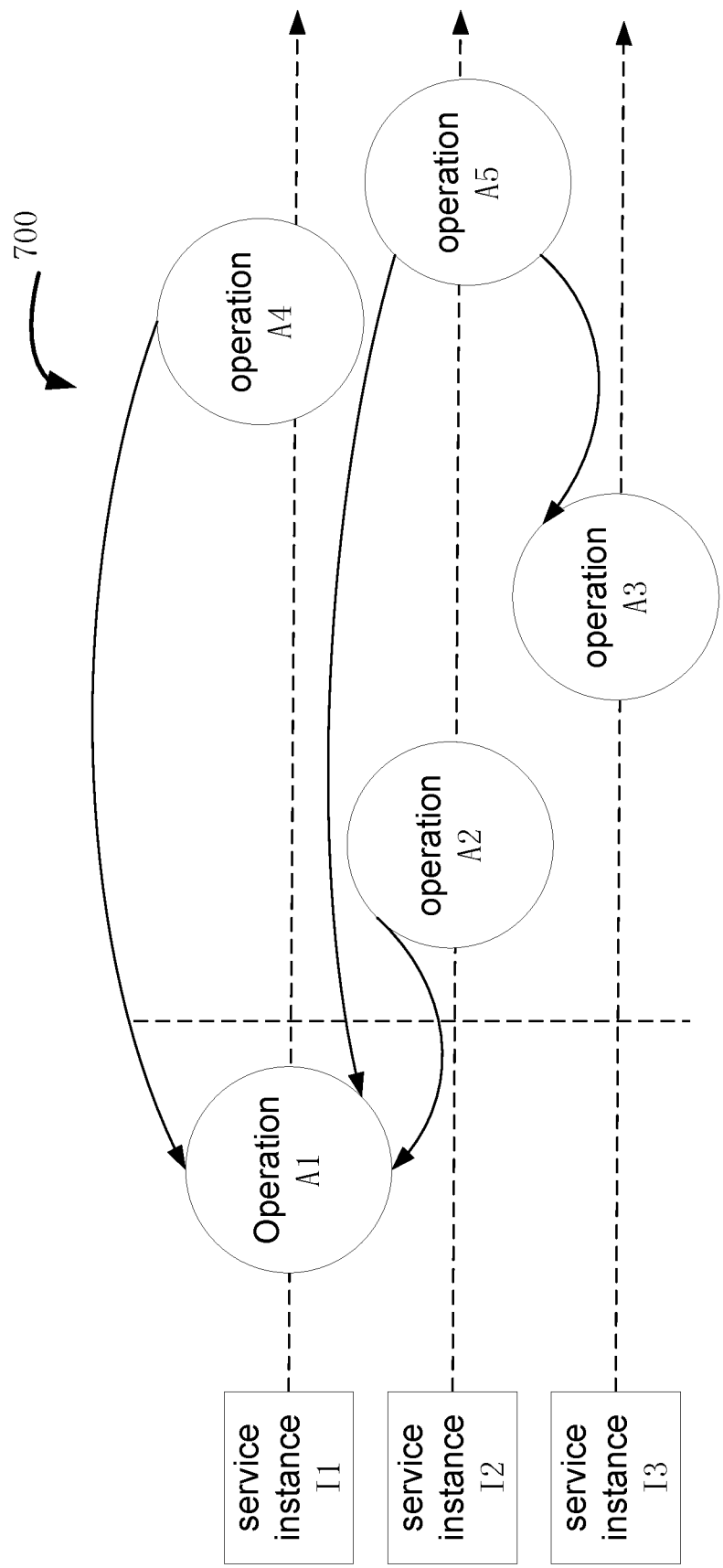
FIG. 7 is a diagram showing dependency based on timeline generated by timeline tool module of embodiments of the present disclosure.

FIG. 7 is a chart 700 showing dependency based on timeline generated by timeline tool module 201 of embodiments of the present disclosure. In connection with FIG. 2, after the dependency analysis module 101 output the related operations having dependency with the specified operation to the timeline tool module 201, the timeline tool module 201 may generate a dependency chart 700, in which the dash lines with arrows and extending to the right represent the timelines, according to the sequence of these operations. In the dependency chart 700, the dependency among the operations of A1-A5 may be shown by the curves with arrows, and information on the service instances corresponding to operations are shown in the dependency chart 700, respectively. As shown in FIG. 7, the operations A1 and A2 are operations related to the service instance I1, the operations A2 and A5 are operations related to the service instance 12, and the operation A3 is an operation related to the service instance 13.

With such dependency chart 700, the user may clearly analyze the dependency between the specified operation and related operations and the time sequence, and may select restore time point. As shown in the dependency chart 700, for example, a vertical dash line may represent a restore time point selected by a user. The timeline tool module 201 may generate a sequence 104 of operations to be undone in a time sequence with operations (operations A2-A5) after the restore time point and send it to the operation rollback engine 102 for the undo processing.

EXAMPLES

Figure 8:
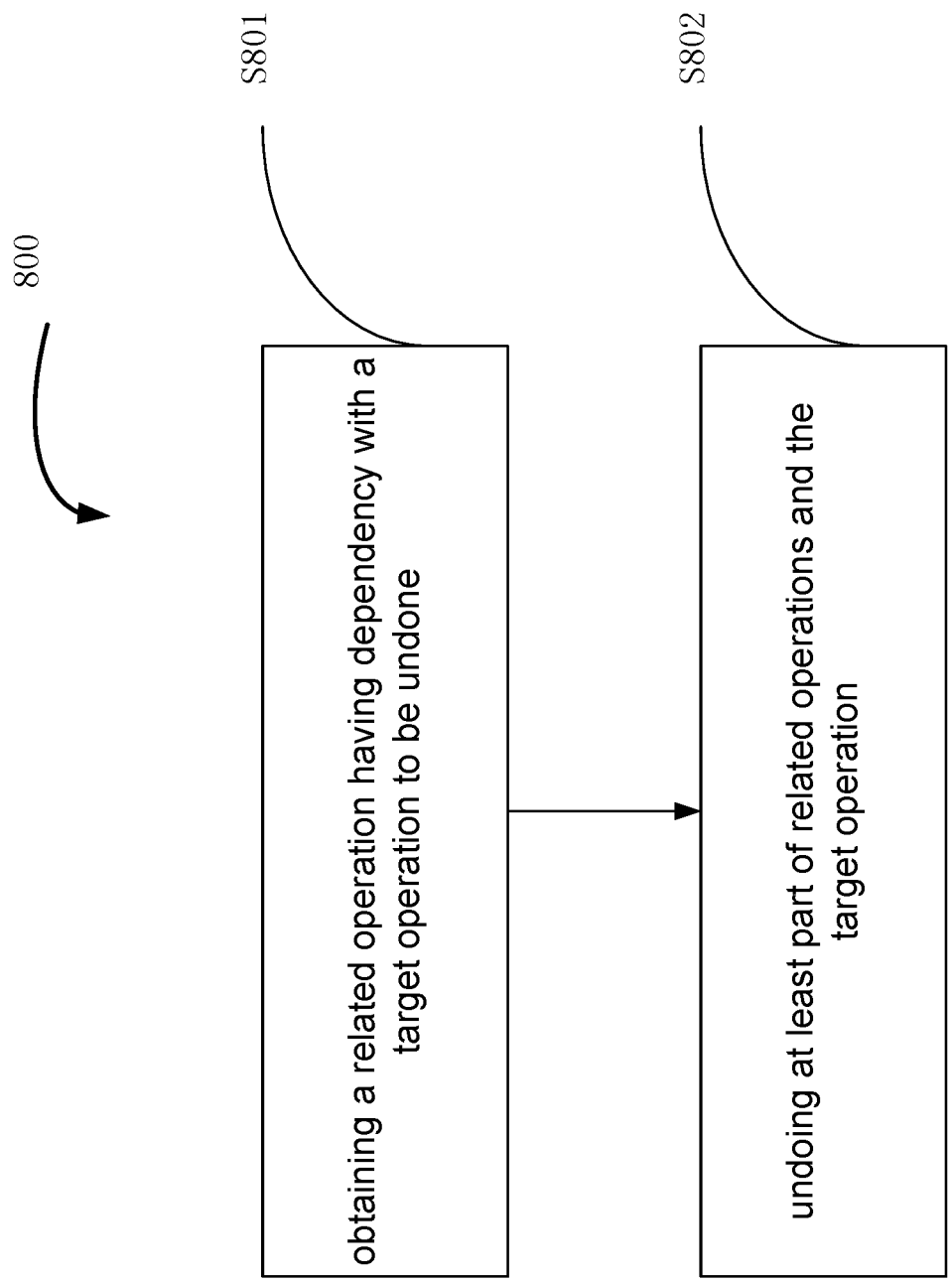
FIG. 8 is a flowchart of an example showing undo operations of embodiments of the present disclosure.

FIG. 8 is a flowchart 800 of an example showing undo operations of embodiments of the present disclosure. The flowchart may include:

S801: obtaining a related operation having dependency with a target operation 103 to be undone, in which the related operation is executed after the target operation. If the execution of the target operation affects directly or indirectly one instance property to which the related operation is related, the target operation and the related operation are regarded as having dependency therebetween.

S802: undoing at least part of related operations and the target operation.

As one example, in S801, the obtaining a related operation having dependency with a target operation 103 to be undone may include: obtaining a first instance property changed by the target operation; obtaining an operation changing the first instance property after the target operation as a related operation according to the first instance property.

As another example, in S801, the obtaining a related operation having dependency with a target operation 103 to be undone may include: obtaining a first instance property changed by the target operation; determining a second instance property having affecting relationship with the first instance property according to the first instance property, the second instance property and the first instance property belong to the same service instance; obtaining an operation changing the second instance property after the target operation as a related operation according to the second instance property.

As still another example, in S801, the obtaining a related operation having dependency with a target operation 103 to be undone may include: obtaining a first instance property changed by the target operation; determining a first service instance to which the first instance property belongs according to the first instance property; determining a second service instance having affecting relationship with the first service instance according to the first service instance, obtaining a second instance property having affecting relationship with the first instance property among the instance properties of the second service instance; obtaining an operation changing the second instance property after the target operation as a related operation according to the second instance property.

Furthermore, S802 may further include: undoing the target operation and at least part of related operation in the related operation in a sequence from new to old based on operation time. More particularly, the target operation and the related operation may be sorted in a sequence of operating time, and the sequence 104 of operations to be undone may be generated. Then the sequence 104 of operations to be undone may be undone in a sequence from new to old based on operation time.

Furthermore, the undoing the target operation and at least part of related operation in the related operation in a sequence from new to old based on operation time may include: performing judgment on the operation to be undone. More particularly, the operation to be undone is any one or more operations of related operation and the target operation. If the operation to be undone involves amending user data, the judgment may be performed on whether or not there is a user data backup before the execution of the operation to be undone. If there is the user data backup, the operation to be undone may be undone, and the user data may be restored to the state before the execution of the operation to be undone with the user data backup. If there is no user data backup, the undo processing is terminated or the undo processing is suspended and send prompt to the user. If the operation to be undone involves no amending to the user data, the operation to be undone is undone.

Furthermore, the following steps may be further included: performing judgment on the operation to be undone, if the operation to be undone is an operation unnecessary to be undone, omitting the operation to be undone.

Figure 9:
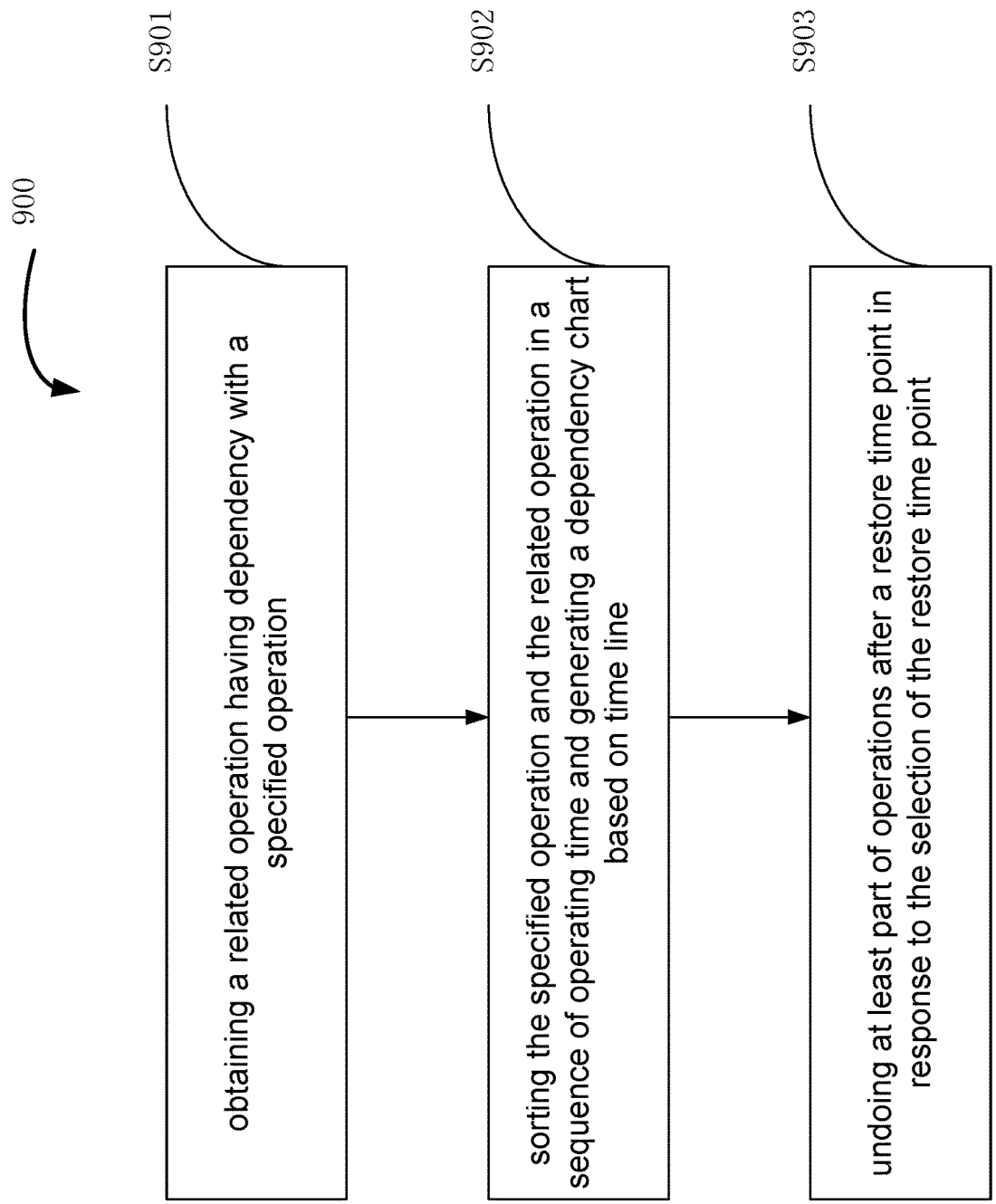
FIG. 9 is a flowchart of another example showing undo operations of embodiments of the present disclosure.

FIG. 9 is a flowchart 900 of another example showing undo operations of embodiments of the present disclosure. The flowchart 900 may include:

S901: obtaining a related operation having dependency with a specified operation, in which the related operation is executed after the specified operation. The specified operation may be an operation recorded in the system operating log.

S902: sorting the specified operation and the related operation in a sequence of operating time and generating a dependency chart based on time line;

S903: undoing at least part of related operations or at least part of target operation and all related operations after a restore time point in response to the selection of the restore time point.

Detailed explanation has been made on the implementation of processing in the above steps in the above and may be applied to all steps similarly.

Examples of Implementation

In some examples, each component or module of system diagram 100 and system diagram 200 and structural diagram 600, such as, dependency analysis module 101, operation rollback engine 102, timeline tool module 201, operation type detection module 601, backup searching module 602, and operation undo module 603 and the like, and one or more steps in the flow chart shown in FIG. 8 and FIG. 9 may be implemented by software, hardware, or in combination of software and hardware. For example, the above component or module and one or more steps may be implemented in system on chip (SoC). Soc may include: integrated circuit chip, including one or more of processing unit (such as center processing unit (CPU), micro controller, micro processing unit, digital signal processing unit (DSP) or the like), memory, one or more communication interface, and/or other circuit for performing its function and alternative embedded firmware.

Figure 10:
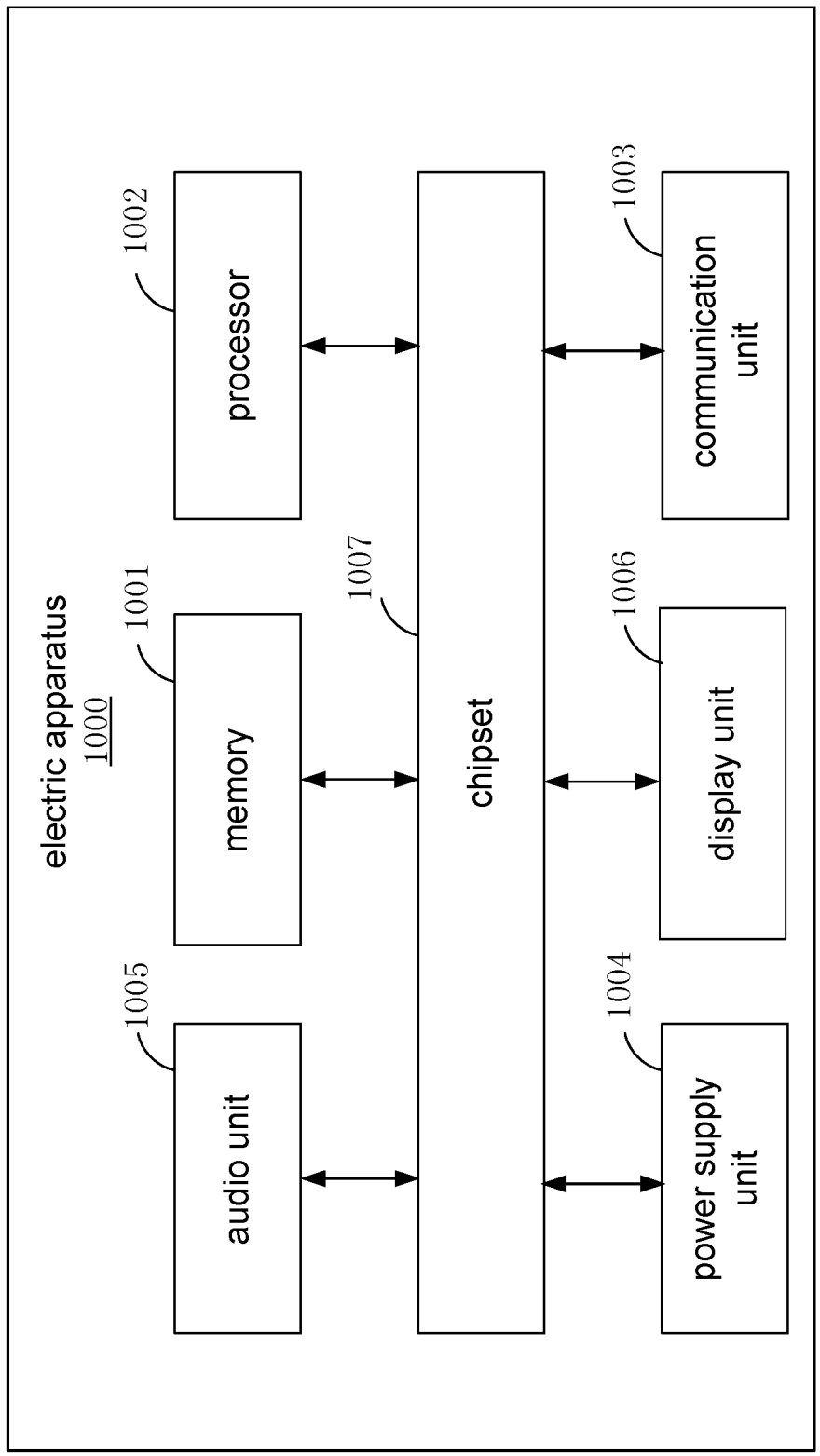
FIG. 10 is a structural block diagram of electric apparatus of embodiments of the present disclosure.

FIG. 10 is a structural block diagram of electric apparatus 1000 of embodiments of the present disclosure. The electric apparatus 1000 may include: a memory 1001 and a processor 1002.

The memory 1001 may be configured to store programs. In addition to the above programs, the memory 1001 may be configured to store other data to support operations on the computer apparatus 1000. The examples of these data may include instructions of any applications or methods operated on the computer apparatus 1000, contact data, phone book data, messages, pictures, videos, and the like.

The memory 1001 may be implemented by any kind of volatile or nonvolatile storage device or their combinations, such as static random access memory (SRAM), electronically erasable programmable read-only memory (EEPROM), erasable programmable read-only memory (EPROM), programmable read-only memory (PROM), read-only memory (ROM), magnetic memory, flash memory, disk memory, or optical disk.

In some examples, the memory 1001 may be coupled to the processor 1002 and contain instructions stored thereon. The instructions may cause the electric apparatus to perform operations upon being executed by the processor 1002, the operations may include:

obtaining a related operation having dependency with a target operation 103 to be undone, in which the related operation is executed after the target operation;

undoing at least part of related operations and the target operation.

If the execution of the target operation affects directly or indirectly one instance property to which the related operation is related, the target operation and the related operation are regarded as having dependency therebetween.

As one example, the obtaining a related operation having dependency with a target operation 103 to be undone may further include:

obtaining a first instance property changed by the target operation;

obtaining an operation changing the first instance property after the target operation as a related operation according to the first instance property.

As another example, the obtaining a related operation having dependency with a target operation 103 to be undone may include:

obtaining a first instance property changed by the target operation;

determining a second instance property having affecting relationship with the first instance property according to the first instance property, the second instance property and the first instance property belong to the same service instance;

obtaining an operation changing the second instance property after the target operation as a related operation according to the second instance property.

As still another example, the obtaining a related operation having dependency with a target operation 103 to be undone may include:

obtaining a first instance property changed by the target operation;

determining a first service instance to which the first instance property belongs according to the first instance property;

determining a second service instance having affecting relationship with the first service instance according to the first service instance, obtaining a second instance property having affecting relationship with the first instance property among the instance properties of the second service instance;

obtaining an operation changing the second instance property after the target operation as a related operation according to the second instance property.

Furthermore, the undoing at least part of related operation and the target operation may further include:

undoing the target operation and at least part of related operation in a sequence from new to old based on operating time.

In some examples, the memory 1001 may be coupled to the processor 1002 and contain instructions stored thereon. The instructions may cause the electric apparatus to perform operations upon being executed by the processor 1002, the operations may include:

obtaining a related operation having dependency with a specified operation, in which the related operation is executed after the specified operation. The specified operation may be an operation recorded in the system operating log;

sorting the specified operation and the related operation in a sequence of operating time and generating a dependency chart based on timeline;

undoing at least part of related operation or at least part of operations in the target operation and the related operation after a restore time point in response to the selection of the restore time point.

Detailed description has been made on the above operations in the above embodiments, and the description on the above operations may be applied to electric apparatus 1000. That is to say, the specific operations mentioned in the above embodiments may be recorded in memory 1001 in program and be performed by processor 1002.

Furthermore, as shown in FIG. 10, the electric apparatus 1000 may further include: a communication unit 1003, a power supply unit 1004, an audio unit 1005, a display unit 1006, chipset 1007, and other units. Only part units are exemplarily shown in FIG. 10 and it is obvious to one skilled in the art that the electric apparatus 1000 only includes the units shown in FIG. 10.

The communication unit 1003 may be configured to facilitate wireless or wired communication between the computer apparatus 1000 and other apparatuses. The computer apparatus may be connected to wireless network based on communication standard, such as WiFi, 2G, 3G, or their combination. In an exemplary example, the communication unit 1003 may receive radio signal or radio related information from external radio management system via radio channel. In an exemplary example, the communication unit 1003 may further include near field communication (NFC) module for facilitating short-range communication. For example, the NFC module may be implemented with radio frequency identification (RFID) technology, Infrared data association (IrDA) technology, ultra wideband (UWB) technology, Bluetooth (BT) technology and other technologies.

The power supply unit 1004 may be configured to supply power to various units of the computer apparatus. The power supply unit 1004 may include a power supply management system, one or more power supplies, and other units related to power generation, management, and allocation.

The audio unit 1005 may be configured to output and/or input audio signals. For example, the audio unit 1005 may include a microphone (MIC). When the computer apparatus in an operation mode, such as calling mode, recording mode, and voice recognition mode, the MIC may be configured to receive external audio signals. The received audio signals may be further stored in the memory 1001 or sent via the communication unit 1003. In some examples, the audio unit 1005 may further include a speaker configured to output audio signals.

The display unit 1006 may include a screen, which may include liquid crystal display (LCD) and touch panel (TP). If the screen includes a touch panel, the screen may be implemented as touch screen so as to receive input signal from users. The touch panel may include a plurality of touch sensors to sense touching, sliding, and gestures on the touch panel. The touch sensor may not only sense edges of touching or sliding actions, but also sense period and pressure related to the touching or sliding operations.

The above memory 1001, processor 1002, communication unit 1003, power supply unit 1004, audio unit 1005 and display unit 1006 may be connected with the chipset 1007. The chipset 1007 may provide interface between the processor 1002 and other units of the computer apparatus 1000. Furthermore, the chipset 1007 may provide interface for each unit of the computer apparatus 1000 to access the memory 1001 and communication interface for accessing among units.

Example Clauses

A. A method for undoing operations, including: obtaining a related operation having dependency with a target operation to be undone, wherein the related operation is executed after the target operation; and undoing at least part of the related operation and the target operation.

B. The method according to paragraph A, wherein if the execution of the target operation affects directly or indirectly one instance property to which the related operation is related, the target operation and the related operation are regarded as having dependency therebetween.

C. The method according to paragraph B, wherein the obtaining a related operation having dependency with a target operation to be undone may include: obtaining a first instance property changed by the target operation; and obtaining an operation changing the first instance property executed after the target operation as the related operation according to the first instance property.

D. The method according to paragraph B, wherein the obtaining a related operation having dependency with a target operation to be undone may include: obtaining a first instance property changed by the target operation; determining a second instance property having affecting relationship with the first instance property according to the first instance property, the second instance property and the first instance property belong to the same service instance; and obtaining an operation changing the second instance property executed after the target operation as the related operation according to the second instance property.

E. The method according to claim paragraph B, wherein the obtaining a related operation having dependency with a target operation to be undone may include: obtaining a first instance property changed by the target operation; determining a first service instance to which the first instance property belongs according to the first instance property; determining a second service instance having affecting relationship with the first service instance according to the first service instance, obtaining a second instance property having affecting relationship with the first instance property among the instance properties of the second service instance; and obtaining an operation changing the second instance property executed after the target operation as the related operation according to the second instance property.

F. The method according to paragraph A, wherein the undoing at least part of related operation and the target operation may include: undoing the target operation and at least part of related operation in a sequence from new to old based on operating time.

G. The method according to paragraph F, wherein the undoing the target operation and at least part of related operation in a sequence from new to old based on operation time may include: performing judgment on an operation to be undone, the operation to be undone is any one or more operations of the related operation and the target operation; performing judgment on whether or not there is a user data backup before the execution of the operation to be undone, if the operation to be undone involves amending to user data; undoing the operation to be undone, if there is the user data backup; and restoring the user data to a state before the execution of the operation to be undone with the user data backup.

H. The method according to paragraph G, wherein the undoing the target operation and at least part of related operation in a sequence from new to old based on operation time further may include: performing judgment on the operation to be undone; and omitting the operation to be undone, if the operation to be undone is an operation unnecessary to be undone.

I. A method for undoing operations, including: obtaining a related operation having dependency with a specified operation, wherein the related operation is executed after the specified operation; sorting the specified operation and the related operation in a sequence of operating time and generating a dependency chart based on timeline; and undoing at least part of related operation or at least part of target operation and related operation after a restore time point in response to the selection of the restore time point.

J. The method according to paragraph I, wherein if the execution of the specified operation affects directly or indirectly one instance property to which the related operation is related, the specified operation and the related operation are regarded as having dependency therebetween.

K. The method according to paragraph J, in which the obtaining a related operation having dependency with a specified operation to be undone may include: obtaining a first instance property changed by the specified operation; and obtaining an operation changing the first instance property executed after the specified operation as the related operation according to the first instance property.

L. The method according to paragraph J, wherein the obtaining a related operation having dependency with a specified operation to be undone may include: obtaining a first instance property changed by the specified operation; determining a second instance property having affecting relationship with the first instance property according to the first instance property, the second instance property and the first instance property belong to the same service instance; and obtaining an operation changing the second instance property executed after the specified operation as the related operation according to the second instance property.

M. The method according to paragraph J, wherein the obtaining a related operation having dependency with a specified operation to be undone may include: obtaining a first instance property changed by the specified operation; determining a first service instance to which the first instance property belongs according to the first instance property; determining a second service instance having affecting relationship with the first service instance according to the first service instance, obtaining a second instance property having affecting relationship with the first instance property among the instance properties of the second service instance; and obtaining an operation changing the second instance property executed after the specified operation as the related operation according to the second instance property.

N. The method according to paragraph I, wherein the dependency chart based on timeline comprises operating time information and corresponding service instance information of the specified operation and the related operation.

O. An electric apparatus, including: a processing unit; and a memory, coupled to the processing unit and containing instructions stored thereon, the instructions cause the electric apparatus to perform operations upon being executed by the processing unit, the operations may include: obtaining a related operation having dependency with a target operation to be undone, in which the related operation is executed after the target operation; and undoing at least part of the related operation and the target operation.

P. The electric apparatus according to paragraph O, wherein if the execution of the target operation affects directly or indirectly one instance property to which the related operation is related, the target operation and the related operation are regarded as having dependency therebetween.

Q. The electric apparatus according to paragraph P, wherein the obtaining a related operation having dependency with a target operation to be undone may include: obtaining a first instance property changed by the target operation; and obtaining an operation changing the first instance property executed after the target operation as the related operation according to the first instance property.

R. The electric apparatus according to claim P, wherein the obtaining a related operation having dependency with a target operation to be undone may include: obtaining a first instance property changed by the target operation; determining a second instance property having affecting relationship with the first instance property according to the first instance property, the second instance property and the first instance property belong to the same service instance; and obtaining an operation changing the second instance property executed after the target operation as the related operation according to the second instance property.

S. The electric apparatus according to paragraph P, wherein the obtaining a related operation having dependency with a target operation to be undone may include: obtaining a first instance property changed by the target operation; determining a first service instance to which the first instance property belongs according to the first instance property; determining a second service instance having affecting relationship with the first service instance according to the first service instance, obtaining a second instance property having affecting relationship with the first instance property among the instance properties of the second service instance; and obtaining an operation changing the second instance property executed after the target operation as a related operation according to the second instance property.

T. The electric apparatus according to paragraph O, wherein the undoing at least part of related operation and the target operation may include: undoing the target operation and at least part of related operation in a sequence from new to old based on operating time.

It would be obvious to one skilled in the art that, all or part of steps for implementing the above embodiments may be accomplished by hardware related to programs or instructions. The above program may be stored in a computer readable storing medium. Such program may perform the steps of the above embodiments upon being executed. The above storing medium may include: ROM, RAM, magnetic disk, or optic disk or other medium capable of storing program codes.

It should be noted that the foregoing embodiments are merely used to illustrate the technical solution of the present disclosure, and not to limit the present disclosure. Although the present disclosure has been described in detail with reference to the foregoing embodiments, one skilled in the art would understand that the technical solutions recited in the foregoing embodiments may be modified or all or a part of the technical features may be replaced equally. These modifications and replacements are not intended to make corresponding technical solution depart from the scope of the technical solution of embodiments of the present disclosure.

The invention claimed is:

1. An electric apparatus, comprising:
    a processing unit; and
    a memory, coupled to the processing unit and containing instructions stored thereon, the instructions cause the electric apparatus to perform operations upon being executed by the processing unit, the operations comprise:
        establishing a timeline for sequence of computing operations;
        saving a target operation and a related operation that is related to the target operation to the timeline according to respective execution times of the target operation and the related operation, wherein the related operation is identified based on the target operation affecting, directly or indirectly, at least one property of a service instance associated with the related operation;
        obtaining an indication that the target operation is to be undone, in which the related operation is after the target operation in the timeline; and
        undoing at least part of the related operation and the target operation in sequence according to the timeline.

2. The electric apparatus according to claim 1, wherein if the execution of the target operation affects directly or indirectly one instance property to which the related operation is related, the target operation and the related operation are regarded as having dependency therebetween.

3. The electric apparatus according to claim 2, wherein the obtaining a related operation having dependency with a target operation to be undone comprises:
    obtaining a first instance property changed by the target operation; and
    obtaining an operation changing the first instance property executed after the target operation as the related operation according to the first instance property.

4. The electric apparatus according to claim 2, wherein the obtaining a related operation having dependency with a target operation to be undone comprises:
    obtaining a first instance property changed by the target operation;
    determining a second instance property having affecting relationship with the first instance property according to the first instance property, the second instance property and the first instance property belong to the same service instance; and
    obtaining an operation changing the second instance property executed after the target operation as the related operation according to the second instance property.

5. The electric apparatus according to claim 2, wherein the obtaining a related operation having dependency with a target operation to be undone comprises:
    obtaining a first instance property changed by the target operation;
    determining a first service instance to which the first instance property belongs according to the first instance property;
    determining a second service instance having affecting relationship with the first service instance according to the first service instance,
    obtaining a second instance property having affecting relationship with the first instance property among the instance properties of the second service instance; and
    obtaining an operation changing the second instance property executed after the target operation as a related operation according to the second instance property.

6. The electric apparatus according to claim 1, wherein the undoing at least part of related operation and the target operation comprises:
    undoing the target operation and at least part of related operation in a sequence from new to old based on operating time.

7. A method for undoing operations, comprising:
    establishing a timeline for a sequence of computing operations;
    saving a target operation and a related operation that is related to the target operation to the timeline according to respective execution times of the target operation and the related operation, wherein the related operation is identified based on the target operation affecting, directly or indirectly, at least one property of a service instance associated with the related operation;
    obtaining an indication that the target operation is to be undone, wherein the related operation is after the target operation in the timeline; and
    undoing at least part of the related operation and the target operation in sequence according to the timeline.

8. The method according to claim 7, wherein if the execution of the target operation affects directly or indirectly one instance property to which the related operation is related, the target operation and the related operation are regarded as having dependency therebetween.

9. The method according to claim 8, wherein the obtaining a related operation having dependency with a target operation to be undone comprises:
    obtaining a first instance property changed by the target operation; and
    obtaining an operation changing the first instance property executed after the target operation as the related operation according to the first instance property.

10. The method according to claim 8, wherein the obtaining a related operation having dependency with a target operation to be undone comprises:
    obtaining a first instance property changed by the target operation;
    determining a second instance property having affecting relationship with the first instance property according to the first instance property, the second instance property and the first instance property belong to the same service instance; and obtaining an operation changing the second instance property executed after the target operation as the related operation according to the second instance property.

11. The method according to claim 8, wherein the obtaining a related operation having dependency with a target operation to be undone comprises:

obtaining a first instance property changed by the target operation;

determining a first service instance to which the first instance property belongs according to the first instance property;

determining a second service instance having affecting relationship with the first service instance according to the first service instance, obtaining a second instance property having affecting relationship with the first instance property among the instance properties of the second service instance; and obtaining an operation changing the second instance property executed after the target operation as the related operation according to the second instance property.

12. The method according to claim 7, wherein the undoing at least part of related operation and the target operation comprises:

undoing the target operation and at least part of related operation in a sequence from new to old based on operating time.

13. The method according to claim 12, wherein the undoing the target operation and at least part of related operation in a sequence from new to old based on operation time comprises:

performing judgment on an operation to be undone, the operation to be undone is any one or more operations of the related operation and the target operation;

performing judgment on whether or not there is a user data backup before the execution of the operation to be undone, if the operation to be undone involves amending to user data;

undoing the operation to be undone, if there is the user data backup; and restoring the user data to a state before the execution of the operation to the undone with user data backup.

14. The method according to claim 13, wherein the undoing the target operation and at least part of related operation in a sequence from new to old based on operation time further comprises:

performing judgement on the operation to be undone; and omitting the operation to be undone, if the operation to be undone is an operation unnecessary to be undone.

15. A method for undoing operations, comprising:

establishing a timeline for a sequence of computing operations;

saving a target operation and a related operation that is related to the target operation to the timeline according to respective execution times of the target operation and the related operation, wherein the related operation is identified based on the target operation affecting, directly or indirectly, at least one property of a service instance associated with the related operation, wherein the related operation is executed after the target operation;

generating a dependency chart based on the timeline; and undoing at least part of related operation or at least part of target operation and related operation after a restore time point in response to the selection of the restore time point in sequence according to the timeline.

16. The method according to claim 15, wherein if the execution of the target operation affects directly or indirectly one instance property to which the related operation is related, the target operation and the related operation are regarded as having dependency therebetween.

17. The method according to claim 16, wherein the obtaining a related operation having dependency with a target operation to the undone comprises:

obtaining a first instance property changed by the target operation; and obtaining an operation changing the first instance property executed after the to operation as the related operation according to the first instance property.

18. The method according to claim 16, wherein the obtaining a related operation having dependency with a target operation to be undone comprises:

obtaining a first instance property changed by the target operation;

determining a second instance property having affecting relationship with the first instance property according to the first instance property, the second instance property and the first instance property belong to the same service instance; and obtaining an operation changing the second instance property executed after the target operation as the related operation according to the second instance property.

19. The method according to claim 16, wherein the obtaining a related operation having dependency with a target operation to be undone comprises:

obtaining a first instance property changed by the target operation;

determining a first service instance to which the first instance property belongs according to the first instance property;

determining a second service instance having affecting relationship with the first service instance according to the first service instance, obtaining a second instance property having affecting relationship with the first instance property among the instance properties of the second service instance; and obtaining an operation changing the second instance property executed after the target operation as a related operation according to the second instance property.

20. The method according to claim 15, wherein the undoing at least part of related operation and the target operation comprises:

undoing the target operation and at least part of related operation in a sequence from new to old based on operating time.

* * * * *